UNITED STATES PATENT OFFICE.

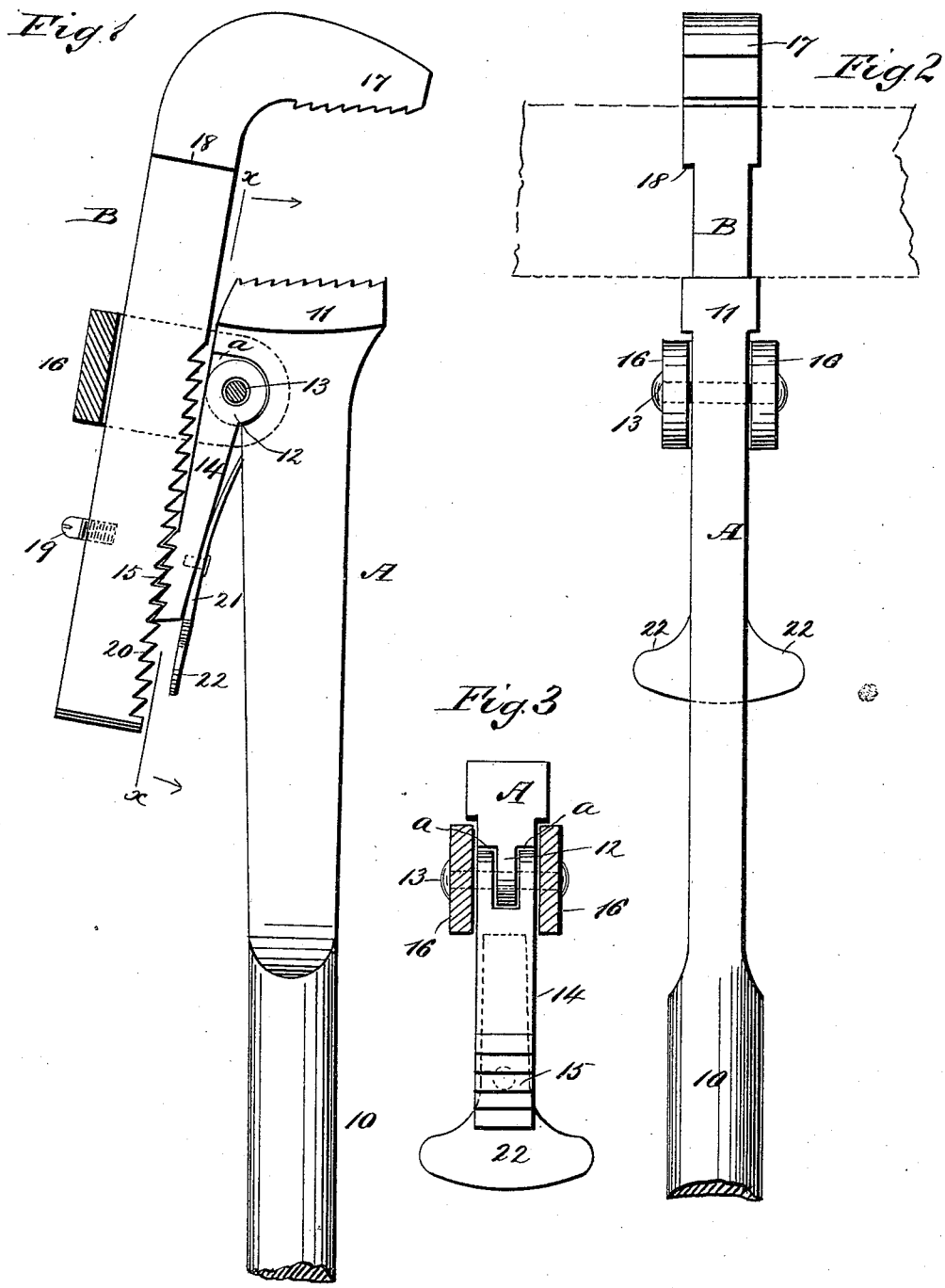

ROBERT HABERTHÜR AND JOHN M. STOWELL, OF NEW YORK, N. Y.

WRENCH.

SPECIFICATION forming part of Letters Patent No. 448,958, dated March 24, 1891.

Application filed April 11, 1890. Serial No. 347,496. (No model.)

*To all whom it may concern:*

Be it known that we, ROBERT HABERTHÜR and JOHN M. STOWELL, both of New York city, in the county and State of New York, have invented a new and useful Improvement in Wrenches, of which the following is a full, clear, and exact description.

Our invention relates to an improvement in wrenches, and has for its object to provide a tool of simple and durable construction and capable of exceedingly quick adjustment; and the invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1 is a side elevation of the wrench, partially in section. Fig. 2 is a front view of the same; and Fig. 3 is a section on line $x\,x$ of Fig. 1, looking in the direction of the arrows.

The wrench consists, primarily, of a shank or body member A and a clamping member B, pivotally attached to the body member and capable of vertical adjustment. The body or shank member A has a handle 10 formed integral with its lower end and a jaw 11 integral with its upper end, which jaw is provided with a toothed gripping-surface.

Below the jaw of the body member A, at the rear side thereof, a slight projection or knuckle 12 is formed, (shown in dotted lines, Fig. 1, and in positive lines, Fig. 3,) the side surfaces of the said body member being recessed at each side of the knuckle, as illustrated at $a$ in Fig. 3, and the knuckle 12 is provided with a central opening adapted to receive a pivot-pin 13. A dog 14, having teeth 15 formed upon its outer face near its lower end and provided with a slotted and apertured upper extremity, is pivoted in the recesses $a$ of the body member by reason of the knuckle 12 thereof passing down into the recess of the dog and the pivot-pin 13 passing through the aperture in the slotted end of the latter and the opening in the knuckle, as heretofore stated, and which is likewise best illustrated in Fig. 3.

The pivotal connection of the gripping or clamping member B with the body member is effected by passing over the gripping member an essentially U-shaped strap 16, which strap is fulcrumed upon the said pivotal pin 13.

The lower portion of the clamping member B is preferably made rectangular in cross-section and is of less thickness than the upper portion or the head, which upper portion or head is carried at a right angle to the squared shank portion and extends over the jaw 11, the said upper portion being toothed upon its under face and constituting the upper jaw 17.

The reduction of the shank portion of the clamping or gripping member B forms a shoulder 18, which limits the downward movement of the said member in its strap or yoke 16, and the upward movement of this member in its strap is limited by a pin or stud 19 being introduced into its rear or outer edge, as shown in Fig. 1.

It will be observed that the pivotal pin 13 not only serves to connect the two members, but also acts as a fulcrum for the dog 14, which is interposed between said members. The teeth of the dog are kept in contact normally with teeth 20, produced upon the inner lower edge of the gripping-section, by means of a spring 21, which spring at or near its center is firmly attached by means of a rivet or otherwise to the inner face of the dog, and the upper end of the spring has a bearing against the inner or rear edge of the body member A, while the lower end of said spring is flattened, so as to project laterally beyond each side of the gripping member B and constitute a bearing or pressure surface for the fingers of the operator, as is best illustrated at 22 in Fig. 2. This spring serves three functions: First, it tends, as heretofore stated, to keep the dog normally in engagement with the toothed surface of the gripping or clamping member; second, by pressing the spring in the direction of the body member the dog is detached from the gripping section or member, and said section or member may be adjusted to increase or to decrease the distance between the jaws 11 and 17, and the third function of the spring is to normally retain the gripping or clamping section of the wrench at an angle to the body, whereby the jaws are brought closer together than if the two sections or members were parallel.

It is obvious that the construction is very simple, few parts being used, and that each and every part is most durable and readily manipulated.

In operation by pressing upon the extension 22 of the spring 21 the dog is carried essentially in contact with the body member, and the gripping member carrying the upper jaw is released. The said gripping member may now be adjusted so that the space between the jaws will essentially correspond with the width of the nut to be turned or with the diameter of a pipe to be operated upon, as this form of wrench is especially adapted for use as a pipe-wrench. When the adjustment has been made, the spring is released, whereupon the dog is again carried in contact with the lower end of the gripping or clamping member, and the said member is carried outward from the body member and the upper jaw made to incline downward, thus serving to more securely grip the pipe or nut.

If found desirable, the teeth may be omitted from the jaws, especially when the device is used as a screw-wrench.

Having thus described our invention, we claim as new and desire to secure by Letters Patent—

1. An improved wrench consisting of a body member formed with a jaw at one end and provided with a handle, a yoke pivoted to the body member adjacent to the jaw thereof, a gripping member fitted to slide in the yoke, formed with a jaw at one end and having teeth on the under side of its shank, a dog pivoted to the body member by the pivot of the yoke and provided with teeth on its upper surface, and a spring for pressing the dog into engagement with the gripping member, secured to the dog, and serving as a means for disengaging the dog from the gripping member, substantially as described.

2. The herein-described wrench, consisting of the body member A, formed with the jaw 11, the knuckle 12, adjacent to the jaw, the dog 14, pivoted to the knuckle and having teeth on its upper surface, the spring 21, secured to the dog and having its inner end engaging the body member and its outer end provided with the finger-piece 22, the yoke 16, pivoted to the body member by the pivot of the dog 14, and the gripping member B, fitted to slide in the yoke and provided with the jaw 17, the shoulder 18, and teeth 20, substantially as herein shown and described.

ROBERT HABERTHÜR.
JOHN M. STOWELL.

Witnesses:
J. F. ACKER,
C. SEDGWICK.